Jan. 25, 1966  R. C. SCHMIEDEL  3,231,806
ELECTRIC MOTOR CONTROL
Filed Jan. 21, 1963  2 Sheets-Sheet 2

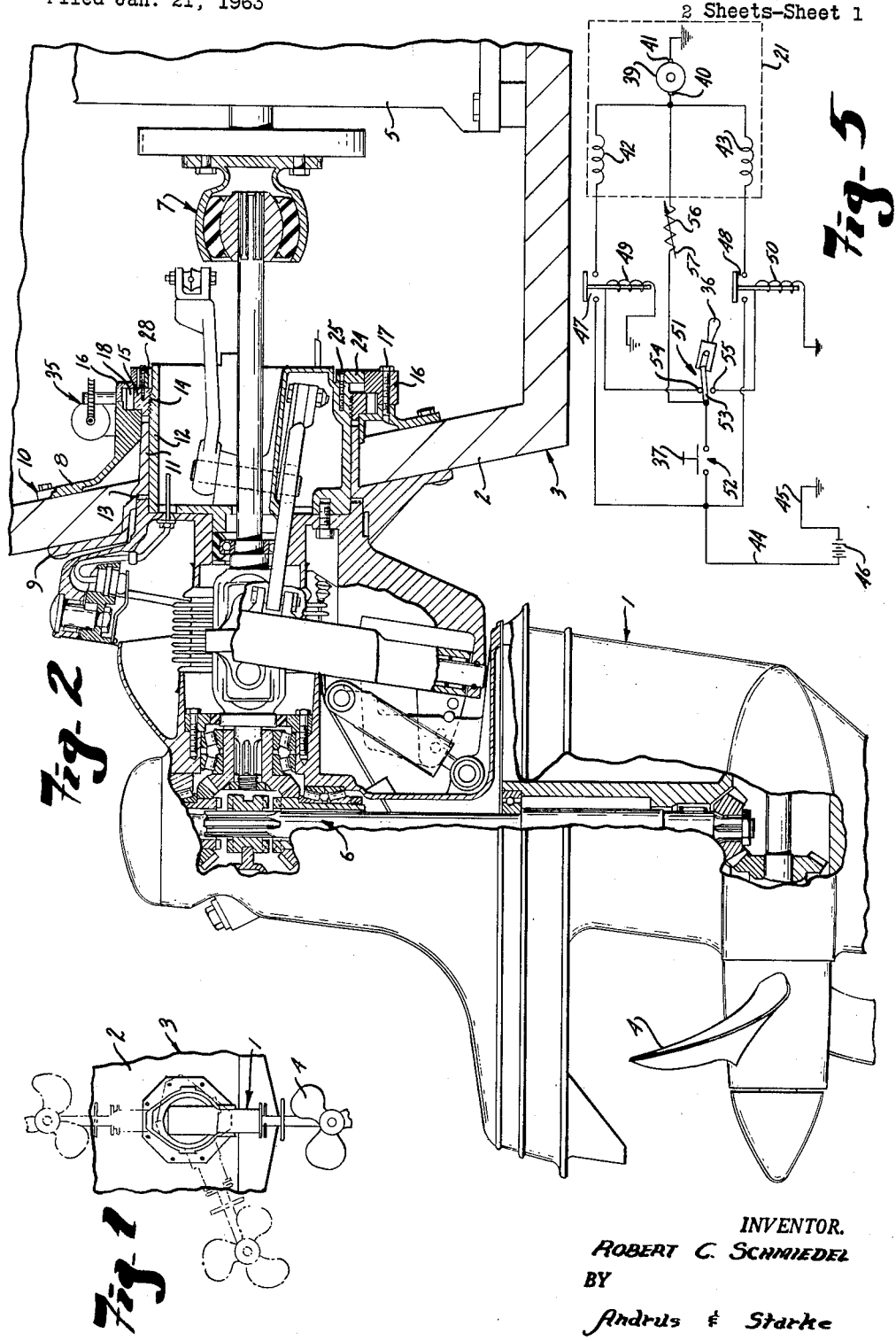

INVENTOR.
ROBERT C. SCHMIEDEL
BY
Andrus & Starke
Attorneys

# United States Patent Office 3,231,806
Patented Jan. 25, 1966

3,231,806
ELECTRIC MOTOR CONTROL
Robert C. Schmiedel, Oshkosh, Wis., assignor to Kiekhaefer Corporation, Fond du Lac, Wis., a corporation of Delaware
Filed Jan. 21, 1963, Ser. No. 252,823
10 Claims. (Cl. 318—252)

This invention relates to an electric motor control and particularly to a control for a series-type motor coupled to position a member against one or more limit stops without exceeding a predetermined force which is less than the maximum capability of the system.

The present invention although readily adapted to any positioning control wherein a member is to be positioned against a stop member, has particularly been adapted to positioning of an outboard propulsion unit. The propulsion unit can be disposed in an operating position with the propeller in the water or a vertically raised position with the propeller out of the water for repair, replacements, storage or the like. Positioning and locking means must be provided to properly locate and hold the propulsion unit in both the lowered operating position and the raised inoperative position. For example, the copending application of Elmer C. Kiekhaefer, et al., entitled Outboard Propulsion Unit Mount Providing for Rotation in a Generally Transverse Vertical Plane which was filed on March 23, 1962, with Serial No. 180,282, now Patent No. 3,136,286 and assigned to a common assignee herewith discloses a particularly satisfactory operating and practical mounting of an outboard motor propulsion unit with means for positioning in a plurality of positions. In that application, a manually operated crank is provided for actuating a gear type drive for rotation of the propulsion unit. Locking and stop means are provided for properly positioning the unit in a lowered operating position and in a raised inoperative position.

Automatic motor-driven positioning means for the propulsion unit can be provided by connection of a suitable electric motor in place of the crank member. However, provision of a simple and reliable means of preventing undue loading of the motor and the system presents certain problems because of the nature of the load. Because of the effects of static friction, inertia and the like in the locking and drive system, a greater force is required to initially move and unlock the motor than is necessary to lock the device in place. Further, the motor must be deenergized in rather accurate timed relation to the movement of the load into a locked position. Although limit switches might be employed, they have disadvantages when employed in an outboard propulsion unit where they are subjected to water, weather and other contaminating elements. Further, the mounting and connecting of the switches would present certain disadvantages from the standpoint of location and ease as well as complexity and cost of maintenance.

The present invention is particularly directed to an electrical control of a series wound motor which permits ready and economical construction to provide full capability of the motor for unlocking and starting the movement of the device and then moving it to a final locking position without exceeding a predetermined capability of the system. In accordance with the present invention, a series wound motor having an armature and a field winding has the armature coupled by a gear reducer assembly or other suitable coupling means to a load member such as the outboard propulsion unit for positioning thereof against one or more mechanical limit stops. An electro-responsive switch means is connected in the field circuit of the motor and includes an electrical control element which is connected to the power supply through a main start switch which is only closed during the initial starting of the motor. The control element is also connected to the ungrounded or high potential side of the motor armature in series with a current limiting resistance or impedance having an appropriate resistance.

In operation, the start switch is actuated to initiate current flow through the control element of the switch means. The switch closes and energizes the motor which begins to operate. Immediately the armature establishes a counter electromotive force, hereinafter abbreviated E.M.F., which appears at the common connection to the field windings and the impedance element and thus at the switch control element. The counter E.M.F. is applied to the control element and holds the switch means in the motor energizing position independently of the positioning of the start switch. The electroresponsive switch means is held closed as long as the electromotive force of the armature exceeds the dropout power or voltage level of the electrical control element of the switch means. As the load increases and the mechanical limit stop is engaged, the armature velocity decreases and the counter E.M.F. decreases accordingly. The switch means reverts to the open circuit position when the counter E.M.F. reaches the dropout power level of the switch means and the motor is deenergized.

The dropout level of the switch element can be designed directly to occur at less than full maximum capability of a total system or adjustment means for varying the dropout voltage within the maximum capability of any one of a number of systems may be provided. For example, a solenoid type switch means may be adjusted by the use of non-magnetic material between the ends of the plunger and a core or by varying the resistance of the impedance element inserted in the electrical control circuit.

When applied to the propulsion unit, a split field series-type motor is preferably provided with the two fields being employed respectively one for raising and one for lowering of the unit. A pair of distinct switch assemblies is provided for individually and separately connecting each of the fields to the power supply. A single-pole double-throw switch is employed to selectively interconnect one of the switch assemblies at a time to the power supply through the single momentary start switch.

The present invention thus provides an improved motor positioning unit providing maximum torque at an initial energization and having means to prevent exceeding of a predetermined locking force or torque.

The drawings furnished herewith illustrate the best mode presently contemplated for carrying out the invention.

In the drawings:

FIG. 1 is a fragmentary rear elevational view of an outboard motor propulsion unit forming a part of an inboard-outboard drive;

FIG. 2 is an enlarged partial side elevational view of an inboard-outboard drive with parts broken away and sectioned to show the mounting and a mechanical means for positioning of the propulsion unit;

FIG. 5 is a schematic circuit diagram showing the electrical motor control system for raising and lowering of the propulsion unit to the final locked positions.

Figure 3:
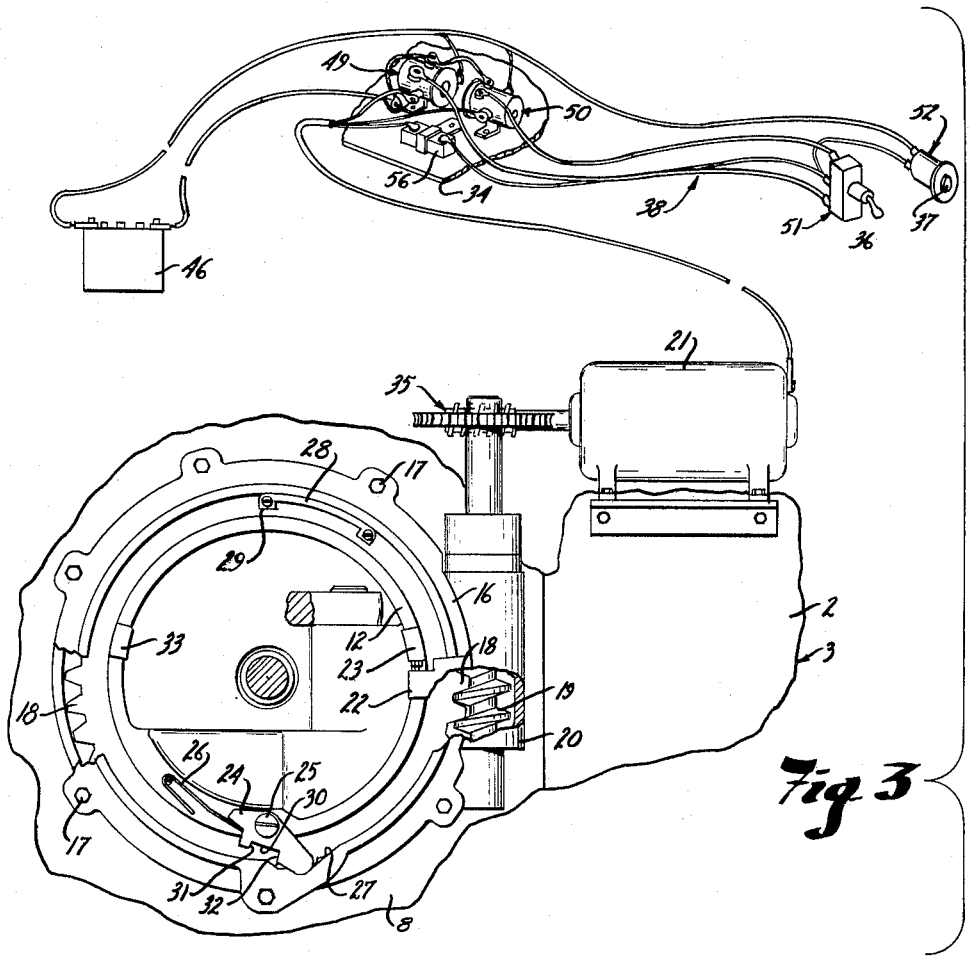
FIG. 3 is an enlarged sectional view taken on line 3—3 of FIG. 2 with parts broken away and sectioned to show the relative positions of a gear drive and locking mechanism when the propulsion unit is in a depending or drive position.

Referring to the drawings and particularly to FIGS. 1 and 2 the present invention as illustrated is applied to an inboard-outboard boat drive and includes a propulsion unit 1 which is pendently and dirigibly suspended outboard from a rear transom 2 of a partially shown boat or other watercraft 3.

The propulsion unit 1 includes a propeller 4 which is driven by an engine 5 mounted inboard of the boat. The propeller 4 is connected to the engine 5 by a right angle drive mechanism 6 which extends upwardly through the propulsion unit 1 and laterally terminating in a splined coupling unit 7 to the shaft of engine 5. The illustrated propulsion unit 1 corresponds to that shown and more fully described in the previously referred to copending application of Elmer C. Kiekhaefer et al.

The suspension for the propulsion unit 1 includes inner and outer plates 8 and 9 which are secured on opposite sides of the transom 2 by means of a plurality of through bolts 10. The outer transom plate 9 includes a forwardly extending cylindrical flange 11 which projects through a corresponding transom opening and terminates within a corresponding opening formed in the inner plate 8. A generally cylindrical or cup-shaped housing or mounting 12 is bolted or otherwise secured to form an integral part of propulsion unit 1 and is slidably and rotatably journaled within the cylindrical flange 11. The outer portion of the flange 11 is stepped and a cooperating spline and groove coupling 13 is provided on the stepped portion and the adjacent portion of the propulsion unit 1 for interlocking of the propulsion unit 1 in predetermined positions. The cup-shaped mounting 12 opens into craft 3 and the innermost portion projects inwardly of the flange 11. The innermost portion includes a threaded portion 14 on the exterior surface to receive a drive nut 15 for axial movement of the mounting 12 and thus propulsion unit 1 with respect to the stepped portion of flange 11. An annular interiorly stepped cover plate 16 is secured by bolts 17 to the plate 9 and rotatably confines the drive nut 15 therebetween for rotation on the cylindrical flange 11. The cover plate 16 and cooperating shoulder on the plate 9 prevent axial movement of the drive nut 15 and consequently rotation thereof causes the cylindrical mounting 12 to move axially for positioning of the propulsion unit 1 and more particularly for engaging and disengaging of the cooperating splines and grooves 13.

The propulsion unit 1 is pivotally mounted on a generally vertical swivel axis and a generally horizontal transverse tile axis as more fully described in the previously referred to Kiekhaefer application. Such structure does not form any part of the present invention and no further description thereof is given. Additionally, the propulsion unit is rotatable on a generally horizontal axis extending fore and aft and coinciding generally with the axis of the drive connection to the engine 5 for movement in a transverse vertical plane to effect inversion of the propulsion unit 1 in accordance with the teaching of the previously referred to Kiekhaefer application. As the present invention is particularly directed to an improved electrical drive for effecting this positioning a brief description of the mechanical drive mechanism to effect the rotation about this axis is given.

Figure 4:
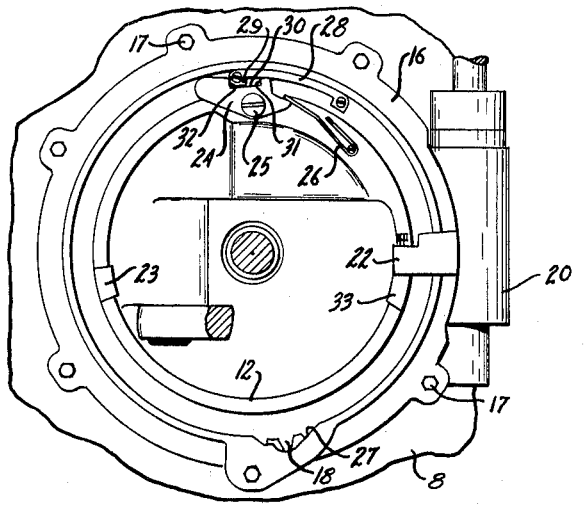
FIG. 4 is a view similar to FIG. 3 showing the propulsion unit rotated 180° with the propulsion unit in the inverted or raised position.

Referring particularly to FIGS. 2, 3 and 4, a ring gear 18 is integrally formed on the outer surface of the drive nut 15 within the confining area defined by the inner plate 8 and the stepped cover plate 16. A worm 19 is supported within a cylindrical housing 20 integrally formed with the plate 8 and in operative engagement with the gear 18. The worm 19 is coupled to be driven by a motor 21 as hereinafter described. Rotation of the worm 19 effects movement of the transom as presently described.

Referring particularly to FIGS. 3 and 4, a stop 22 is secured to the annular stepped cover plate 16 and is located generally radially inwardly of the opening therein. A positioning lug 23 is secured to the edge of the cylindrical mounting 12 for engagement with stop 22 when the propulsion unit 1 is in the depending or operating position as shown in FIG. 1. A pawl 24 is pivotally secured by pivot screw 25 to the edge of the cup-shaped mounting 12 in angularly spaced relation to the stop lug 23. A flat hairpin type spring 26 is also secured to the edge of mounting 12, engages one end of the pivot pawl 24 and urges the opposite end into engagement with a notch 27 in the stepped cover plate 26. The engagement of lug 23 with stop screw 22 and pawl 24 with notch 27 rigidly holds the cup-shaped mounting 12 and therefore propulsion unit 1 in a locked position while moving of mounting 12 to engage or disengage the connection 13.

Generally, the rotation of the drive nut 15 through one-half revolution in an unthreading direction moves the cup-shaped mounting 12 rearwardly to completely disengage the groove and spline coupling 13 and allow the subsequent rotation of the propulsion unit 1 about a horizontal axis, as follows.

A pawl engaging member 28 is secured to the outer face of the drive nut 15 and in the position shown in FIG. 3 is diametrically located with respect to the pawl 24. The pawl engaging member 28 includes an inwardly projecting lug 29 which moves into engagement with the pawl 24 as a result of the previously described 180° rotation of the drive nut 15 for releasing of the spline and groove coupling 13. The pawl 24 includes a recess 30 on the outer edge thereof and defines a pair of shoulders 31 and 32. With the pawl 24 held by spring 26 in the locking position, the inwardly projecting lug 29 of pawl engaging member 28 moves past the shoulder 31 and engages the base of the recess 30. Continued rotation of the drive nut 15 in the unthreading direction, pivots the pawl member 24 in a counterclockwise direction as viewed in FIG. 3 and lifts the locking end out of the notch 27 of cover plate 16. The lug 29 finally moves into engagement with the shoulder 32 and the continued rotation of the drive nut 15 in the unthreading direction results in carrying of the housing of the cup-shaped mounting 12 and the propulsion unit 1 therewith.

A stop lug 33 is integrally secured to and projects forwardly from the forward edge of the housing member 12. As the mounting 12 is rotated counterclockwise, the lug 33 moves into engagement with the back side of the stop 22 as shown in FIG. 4 to prevent further movement in a raising direction and properly locates the propulsion unit 1 in the raised position of FIG. 1.

In the illustrated embodiment of the invention, the first half revolution of the drive nut 15 separates the propulsion unit 1 from the transom plate 9 to disengage coupling 13 and the final half revolution carries the propulsion unit 1 to the inverted position.

When it is desired to return the propulsion unit 1 to the depending operating position, the nut member 15 is rotated in the opposite or clockwise direction by reverse rotation of the worm 19. Referring to FIG. 4, during the initial movement of the drive nut 15, the lug 29 of pawl engaging member 28 moves with the drive nut relative to the pawl member 24 and into engagement with the opposite shoulder 31 of the pawl member 24. Further rotation of the drive nut in the lowering direction positively pulls and rotates the mounting 12 in the opposite direction and returns the propulsion unit 1 to its operating position. As the propulsion unit 1 approaches the final lowered or operating position, the force of the spring 26 causes the pawl 24 to pivot into bearing engagement with the notch 27 in the stepped cover plate 16. Simultaneously, stop lug 23 engages the stop 22 and locks the assembly against rotation upon a horizontal axis, as previously described.

Movement of the propulsion unit 1 and housing member is thereby prevented and continued rotation of the drive nut 15 in the lowering direction draws the mounting 12 through the opening of the transom and establishes reengagement of the spline and groove coupling 13.

Generally, the structure corresponds to that of the previously referred to Kiekhaefer application where a manual operator is coupled to the worm 19. The present invention is particularly directed to the provision of motor 21 and the control circuit therefor to position the propulsion unit 1 between the mechanical limit stops, shown as the opposite end of stop 22, without establishment of damaging forces within the mechanism.

Referring particularly to FIG. 3, the motor 21 and controlling components therefor are shown adapted to be mounted within the craft 3 by a suitable mounting 34 adjacent the transom 2. A worm gear assembly 35 couples the output of motor 21 to the worm 19 for selective rotation of drive nut 15. The illustrated motor is of a split series type as schematically shown in FIG. 5 and is adapted to drive the worm 19 in either a raising and lowering direction for corresponding positioning of the propulsion unit 1. A directional control switch lever 36 and a start button 37 are connected by suitable leads 38 to actuate switches and control motor 21, as subsequently described. Leads 38 allow convenient locating of the lever 36 and button 37 within the boat 3.

Referring particularly to FIG. 5, the motor is diagrammatically shown as a split series type motor having a rotating armature 39 which is coupled to the worm portion of the worm and gear assembly 35. Commutating brushes 40 and 41 connect the armature 39 in individual circuit with a pair of series of field windings 42 and 43. Power supply lines 44 and 45 selectively connect a battery 46 to energize the field winding 42 or 43 in series with the armature 39. In the illustrated arrangement, the motor 21 runs in one direction or the other in accordance with which field winding 42 or 43 is energized. The line 45 and commutator brush 41 are shown grounded to provide the common return although a common bus, isolated from ground, may also be employed if desired. A pair of solenoir actuated switches 47 and 48 are connected prespectively in the circuit between the power line 44 and the associated field 42 and 43. The solenoid switches 47 and 48 are electromagnetically coupled to operating coils 49 and 50 respectively. A single-pole double-throw switch 51 is coupled to and operated by the lever 37, shown in FIG. 3. Switch 51 selectively connects either solenoid coils 49 or 50 to the undergrounded power line 44 and in series with a push button main start switch 52 which is coupled to and operated by the push button 37 of FIG. 3.

Switch 51 includes a movable contact arm 53 connected to the one side of the push button start switch 52. A raise or lift contact 54 connected to the solenoid coil 49, the opposite side of which is connected to ground for completing the power line circuit to grounded line 45. The switch 51 also includes a lower or drop contact 55 connected to the solenoid coil 50, the opposite side of which is connected to ground.

Momentarily closing switch 52 results in a corresponding energization of either solenoid coil 49 or 50, depending upon the position of the single-pole double-throw switch 51. One of the associated switches 47 and 48 is then closed, the corresponding field 42 or 43 is energized and the armature 39 rotates in a related direction. In accordance with well-known operation of a split series type motor, the armature develops a counter electromotive force between the brushes 40 and 41 and the present invention employs this voltage to control motor operation and prevent undue loading of the system, as follows.

A resistance 56 is connected to the commutator brush 40 and to the switch arm 53 of the single-pole double-throw switch 51. As a result, the counter electromotive force developed by the motor armature 39 is impressed upon the appropriate solenoid coil 49 or 50 and holds the corresponding switch 47 or 48 closed as long as the counter electromotive force is greater than the dropout voltage of the solenoid.

The resistor 56 is a current limiting resistance and is diagrammatically shown as a variable unit by a conventional arrow 57. The current limiting resistor 56 prevents damaging current flow. The resistance of resistor 56 inserted in the circuit determines the dropout point of the solenoids by adjusting the proportion of the counter electromotive force of the armature 39 which is impressed on the solenoid coils 49 or 50. The system is adjusted to open the energizing circuit for the motor 39 before damaging forces or torque loads are established in the lifting system heretofore described.

In summary, the illustrated embodiment of the invention functions as follows. The single-pole double-throw switch 51 is set to raise or lower the propulsion unit 1 as desired by appropriate positioning of the lever 36. Although not shown suitable indicia can be provided adjacent the lever 36 to indicate the appropriate position thereof for raising or lowering of unit 1. Assuming the propulsion unit 1 is in the full line position of FIG. 1 and thus in the lowered position, the switch lever 36 would then be positioned in the raised position to connect the raise solenoid coil 49 in circuit with the push button switch 52. Button 37 is momentarily pressed to complete the circuit to the solenoid coil 49 and close the associated switch 47. Current flows through the field coil 42 and the motor armature 39. The motor 21 immediately begins to run and rotate the worm 19 and therefore drive nut 15. Rotation of armature 39 generates a counter electromotive force which is impressed on coil 48 and maintains the energization of the motor.

The motor 21 therefore continues to rotate and drives the worm 19 and drive nut 15 in an unthreading direction with respect to the cup-shaped mounting 12. The initial 180° or half revolution of the drive nut 15 results in outward movement of the mounting 12 and the attached propulsion unit 1 to disengage the groove and spline coupling 13 and thereby allow rotation of the propulsion unit 1 in a transverse plane. Continued rotation of the drive nut 15 results in release of the locking pawl 24 and engagement of the lug 29 of the pawl engaging member 28 with the pawl shoulder 32. The subsequent rotation of the drive nut 15 carries the mounting 12 and the attached propulsion 1 through 180° to position the propulsion unit 1 in the vertical phantom line position shown in FIG. 1.

When the propulsion unit 1 is in the vertical position, the top lug 33 engages the back side of stop 22 and prevents further rotation of the unit. The load increases and reduces rotation of the armature 39 as the system approaches the locking force or torque. However, as the load increases due to the approaching of this lock-up position, the armature velocity decreases with a resulting decreaese in the counter E.M.F. When the proportion of the counter E.M.F. applied to coil 49 drops to the dropout voltage of the solenoid, the circuit opens and the motor 39 is deenergized and can only be started by a subsequent actuation of the lever 36 and button 37.

When it is desired to lower the propulsion unit 1, the lever 36 is placed to the lowering position to place switch 51 in operative circuit connection to the solenoid coil 50. Push button switch 37 is then actuated to momentarily close the switch 52 and energize solenoid coil 50 which closes switch 48 and energizes the opposite or lowering field winding 43. Motor 21 rotates in the opposite direction and drives the worm 19 in the opposite direction. The drive nut 15 revolves in a threading direction onto the mounting 12. The initial rotation of the drive nut 15 causes the lug 29 to move into engagement with the opposite shoulder 31 in the recess of the pawl 24. Thereafter, continued rotation of the drive nut 15 rotates the mounting and the attached propulsion unit 1 in the opposite or lowering direction. After 180° rotation the pawl 24 drops into locking engagement with the notch 27 and the stop lug 23 engages the stop screw to properly position the propulsion unit 1. The pawl engaging member 28 is disengaged from the pawl 24 and continued rotation of the nut 15 serves to draw the mounting 12 inwardly to effect engagement of the spline and groove coupling 13.

At the moment of complete interengagement, the load on the motor 21 increases and approaches the lockup condition. However, once again the armature velocity and related counter electromotive force decreases. At the moment the dropout voltage of the solenoid is reached, switch 18 opens and deenergizes the motor 21 to prevent abnormal and damaging loading of the motor and the lifting system.

The present invention is particularly adapted for application such as the lowering and raising of a propulsion unit because in the initial raising or lowering, the full capability of the motor and the system is applied to unlock the device and overcome the effects of static friction and inertia. While maintaining the maximum torque output, the motor control through the counter E.M.F. positively prevents exceeding of the predetermined locking force or torque from the system.

Although the illustrated embodiment of the invention includes a variable current limiting resistor for proper setting of the dropout voltage of the solenoids any other system might be employed. For example, the magnetic circuit of the solenoid switches might be constructed with suitable non-magnetic elements between the end of a plunger and a core forming a part of a solenoid to vary the dropout voltage in accordance with known controls.

If during the raising and lowering of the propulsion unit 1 it is desired to position the unit intermediate the two final stop positions, the operator may open the single-pole double-throw switch by centrally locating the lever 36. This will automatically break the circuit to the motor 21 which will stop and hold the mechanism in the intermediate position.

The present invention thus provides an improved and novel means for positioning a member against one or more mechanical limit stops without exceeding a predetermined force on the system. The invention is particularly adapted to be applied for raising and lowering of a propulsion unit although it might well be applied in other applications.

Various modes of carrying out the invention are contemplates as being within the scope of the following claims particularly pointing out and distinctly claiming the subject matter which is regarded as the invention.

I claim:

1. A motor control for controlling the operation of a series wound motor having a field winding connected in series with an armature, which control comprises,
    (a) an electroresponsive switch means adapted to be connected in series with said field winding to control energization thereof and having an electrical input,
    (b) a main start switch means connected in series with said electrical input including self-opening means whereby the switch means is momentarily closed during starting of said motor, and
    (c) circuit means adapted to be connected to said electrical input and said armature and impressing at least a portion of the counter electromotive force of the armature on said electroresponsive switch means to maintain motor operation under normal loads and to automatically de-energize the motor under impending damaging loads.

2. The motor control of claim 1 wherein said circuit means includes a variable resistance for adjusting the proportion of the counterelectromotive force applied to the electroresponsive switch means.

3. A motor control for stopping the operation of a series wound motor having a field winding connected in series with an armature in response to preselected loading of the armature, which control comprises,
    (a) a solenoid switch means adapted to be connected in series with said field winding to control energization thereof and having an operating winding,
    (b) a main start switch connected in series with said operating winding and having means urging the switch open whereby the switch may be momentarily closed for starting of said motor, and
    (c) an impedance means connected in series with said operating winding and adapted to be connected to said armature for energizing said electroresponsive switch in accordance with the counterelectromotive force of said armature after the main start switch opens.

4. A motor control for controlling a split series motor having two series field windings with a common connection to said armature winding and individually connected in series with the armature and a source of power and establishing a mechanical output, said control comprising,
    (a) a movable load member adapted to be connected to said armature and moved in different paths by opposite rotation of said armature,
    (b) stop means in said paths limiting the movement of said load member, said load member and stop means having a maximum force capacity less than the full capability of said split series motor,
    (c) a pair of solenoid operated switches adapted to be connected in series one with each of the field windings whereby said armature can be caused to rotate in opposite directions, said switches having separate controlling solenoid windings,
    (d) a single-pole, double-throw switch having a common pole and opposite contacts connected one to each of said controlling solenoids,
    (e) a start switch connected to said common pole, and
    (f) a variable resistance connected to said common pole and adapted to be connected to the common connection of said field windings and to adjust the proportion of the counterelectromotive force impressed upon said solenoid windings with said start switch open.

5. A motor control for controlling a split series motor having two series field windings with a common connection to an armature winding of an armature and individually connected in series with the armature winding, said control comprising,
    (a) a movable load member adapted to be connected to said armature and moved in different paths by opposite rotation of said armature,
    (b) stop means in said paths positively limiting the movement of said load member,
    (c) electroresponsive switch means adapted to selectively connect the field windings in circuit for driving of said armature in opposite directions, said electroresponsive switch means including a pair of separate controlling means, one for each rotational direction,
    (d) a start switch means adapted to be connected to a source of power,
    (e) directional control switch means connected to said controlling means and adapted to selectively connect said controlling means to the start switch means, and
    (f) an impedance connected between said directional control switch means and said armature and connecting said armature winding in series with the controlling means operatively connected to the start switch means.

6. A motor control for controlling a split series motor having two series field windings having a common connection to said armature winding and individually connected in series with the armature and having a rotary output, said control comprising,
    (a) a movable load member adapted to be connected to said armature and moved in different paths by opposite rotation of said armature,
    (b) stop means in said paths positively limiting the movement of said load members,
    (c) a pair of solenoid operated switches adapted to be connected one each in series with the two series field windings for driving of said armature in opposite directions, said switches having separate controlling solenoids, said solenoid operated switches having a drop-out voltage corresponding to a preselected maximum loading of the armature,
(d) a single-pole, double-throw switch having a common pole and opposite contacts connected one to each of said controlling solenoids,
(e) a start button connected to said common pole, and
(f) a variable resistance connected to said common pole and adapted to be connected to said common connection of said field windings.

7. A remotely operable positioning control for an inboard-outboard watercraft drive having a propulsion unit pendently and dirigibly supported within an opening in the transom and having rotating means to move the propulsion unit in a vertical plane, said control comprising,
(a) coupling means adapted to be connected to said rotating means,
(b) stop means adapted to limit the rotation of said propulsion unit in the vertical plane,
(c) a series wound motor having a field winding and an armature coupled to actuate said coupling means for rotating the propulsion unit,
(d) an electroresponsive switch connected in circuit with said field winding and adapted to complete a power circuit thereto, said switch having a selected drop-out voltage corresponding to a selected impending load on said armature,
(e) first switch means adapted to be momentarily operated and connecting said electroresponsive means in an energizing circuit with said motor,
(f) second switch means connecting said electroresponsive switch in a separate energizing circuit to the armature the output of which operably energizes the electroresponsive switch during a preselected minimum loading of said armature, and
(g) cable means connecting said switch means in said energizing circuits for remote location of said switch means.

8. A positioning control for an inboard-outboard watercraft drive having a propulsion unit pendently and dirigibly supported by a mounting assembly within an opening in the transom and having rotating means to move the propulsion unit in a vertical plane, said control comprising,
(a) stop means carried by the mounting assembly and adapted to limit the rotation of said propulsion unit in said vertical plane,
(b) a series wound motor having a field winding operatively associated with a rotatable armature coupled to rotate said propulsion unit into engagement with the stop means,
(c) an electroresponsive switch means connected in circuit with said field winding and adapted to complete a power circuit thereto, said switch means having a drop-out voltage corresponding to a selected load on said armature,
(d) first switch means connected to said electroresponsive means and adapted to selectively connect the electroresponsive means in an energizing circuit to a source of power, and
(e) second switch means connecting said electroresponsive switch in a separate energizing circuit to the armature for energizing the electroresponsive switch by the counterelectromotive force of said armature.

9. The control of claim 8 wherein,
(a) said first switch means includes means resiliently urging it to a normally open circuit position whereby the switch means must be held in the closed circuit position.

10. The control of claim 8 wherein,
(a) said motor includes a second field winding operatively associated with the armature and effective to rotate the armature in a direction opposite to that of the first field winding,
(b) second electroresponsive switch means connected in circuit with said second field winding and adapted to complete a power circuit thereto, said switch means having a drop-out voltage corresponding to a selected load on said armature, and
(c) said first switch means is also connected to said second electroresponsive switch means and is adapted to selectively connect the second electroresponsive switch in an energizing circuit to a source of power.

References Cited by the Examiner

UNITED STATES PATENTS

| 2,137,721 | 11/1938 | Jones | 318—252 |
| 2,483,515 | 10/1949 | Alexander | 318—459 |
| 2,715,706 | 8/1955 | Chin | 318—267 |
| 3,021,474 | 2/1962 | Byloff | 318—297 |

ORIS L. RADER, *Primary Examiner.*